May 29, 1934.  W. A. VAN BERKEL  1,960,421
SLICING MACHINE MOUNTING
Filed Nov. 20, 1931
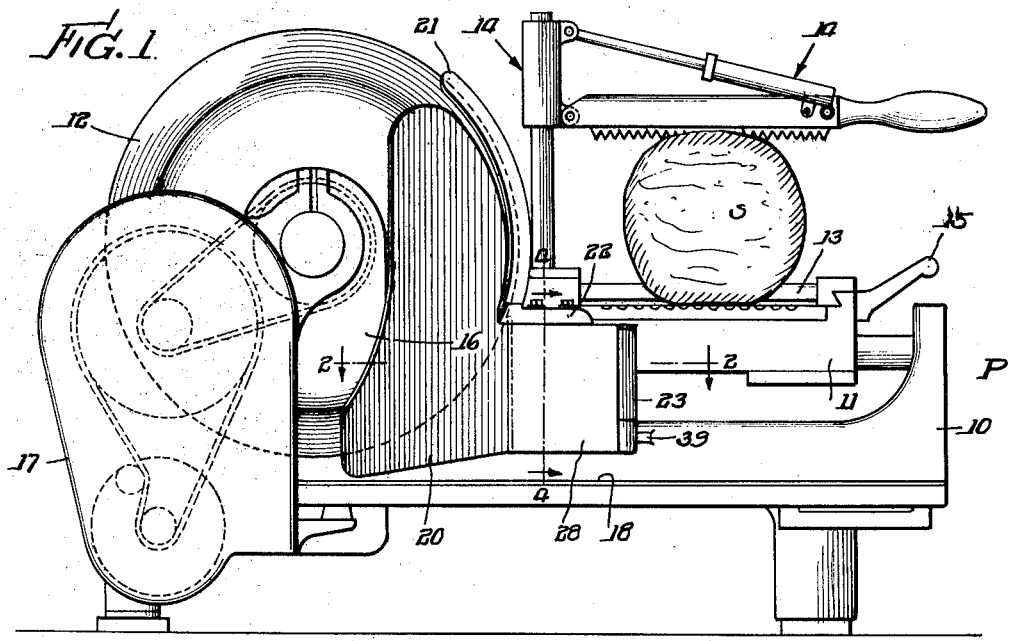
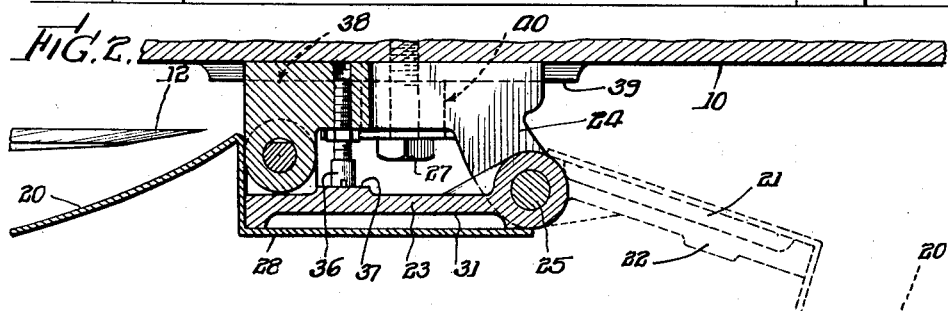
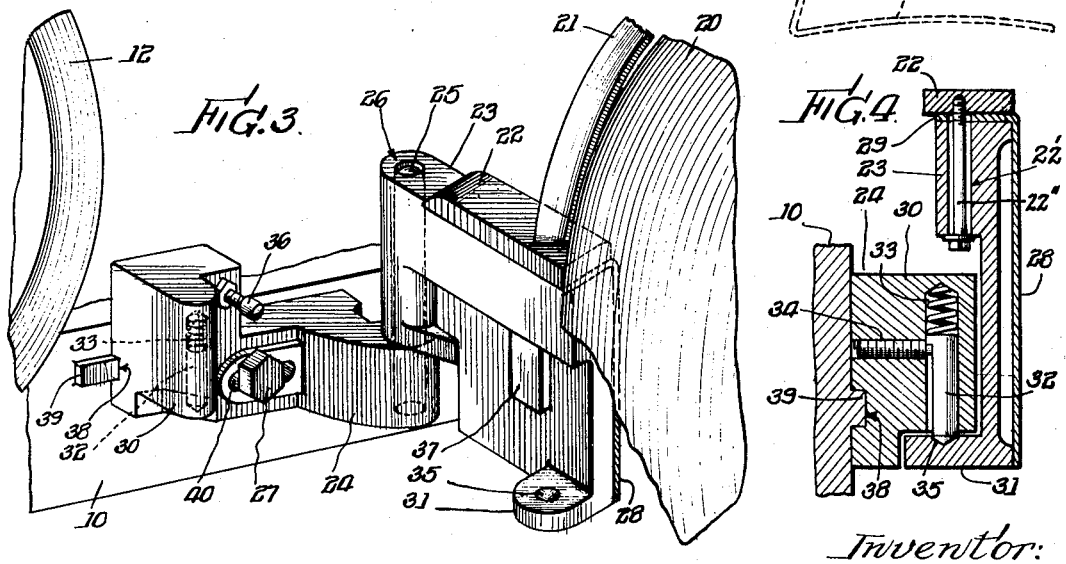
Inventor:
Wilhelmus Adrianus van Berkel,
By: Cheever, Cox & Moore
attys.

Patented May 29, 1934

1,960,421

UNITED STATES PATENT OFFICE 1,960,421

SLICING MACHINE MOUNTING

Wilhelmus Adrianus van Berkel, Clarens, Switzerland, assignor to U. S. Slicing Machine Company, La Porte, Ind., a corporation of Indiana Application November 20, 1931, Serial No. 576,352
In Great Britain August 5, 1931

5 Claims. (Cl. 146—102)

This invention relates to slicing machines in which the slicing of the substance is performed by a rotary circular knife.

It is usual in such machines to provide adjacent to the knife a slice deflector whose function is to guide the successive slices away from the knife as they are being cut and to protect the operator's hand while holding the slices, the operative position of the deflector being such that it is disposed closely adjacent to the cutting edge of the knife.

It is known in connection with slicing machines to mount the slice deflector in such a manner that it can be turned about a vertical axis away from the back of the knife, but towards the bracket supporting the knife, into an inoperative position in order that the deflector and the back of the knife can be cleaned, the usual mounting consisting of some form of attachment with the said bracket. It is desirable, mainly in the interests of hygiene, that cleaning of the slice deflector and knife should take place frequently, but this desideratum usually cannot be realized because the slice deflector, when turned into its inoperative position, is somewhat inaccessible from the operator's usual stance at one end of the machine, this being especially so where the shop or the counter is too small to afford the provision of sufficient space to enable the operator to move freely to different parts of the machine. Existing slicing machines are therefore subject to a disadvantage, namely, that the slice deflector and knife back cannot be cleaned with sufficient facility; and the object of this invention is to remove the said disadvantage.

The primary object of the invention is to provide a slicing machine with a slice deflector which has a pivotal mounting so constructed as to permit the slice deflector to be turned out of its operative position in a direction away from the knife support or bracket, that is, in a direction toward the operator's usual stance.

Another object of the invention is to provide a pivotal mounting having pivotally mounted members which interlock when the slice deflector occupies its operative position and which become unlocked when the slice deflector is turned out of normal operating position toward inoperative position, thereby permitting the slice deflector to be removed from the machine.

A further object is to provide a pivotally mounted slice deflector which has certain of its members provided with an automatic catch for holding the parts in interlocked position when the deflector occupies its normal operative position.

A still further object is to provide a slicing machine with a slice deflector which may be mounted as a part of the same unit as the knife guard and the skin support member so that all of said parts can be turned as a unit out of operative position.

Numerous other objects and advantages will be apparent throughout the progress of the following specification.

The accompanying drawing illustrates a selected embodiment of the invention and the views therein are as follows:

Fig. 1 is a detail elevation of a slicing machine embodying the invention.

Fig. 2 is a detail sectional view on the line 2—2 of Fig. 1.

Fig. 3 is a detail perspective view of the pivotally mounted slice deflector, knife, guard, and skin support.

Fig. 4 is a detail sectional view on the line 4—4 of Fig. 1.

The slicing machine herein shown comprises a base 10 upon which a substance supporting carriage 11 is slidably mounted. A circular slicing knife 12 is mounted at one end of the machine to slice the substance S which is supported on a feed table 13 and held in position by an adjustable clamp 14. A handle 15 is mounted on the carriage 11 by means of which the operator, whose position is denoted by the letter P, can reciprocate the carriage past the knife. The knife 12 is journalled in a stationary bracket or support 16 and is rotated by an electric motor through the intermediary of appropriate gearing which is housed in the gear case 17. The construction of the gear case and the mechanism for rotating the knife 12 forms no part of the present invention as the same is described and claimed in applicant's copending application, Serial No. 576,351, filed November 20, 1931.

The slicing machine is also provided with a slice receiving platform 18 which is mounted on the forward side of the knife and to the left of the operator's stance.

The construction and operation of the machine so far described are well known to those familiar with the art so no further description thereof will be made. It is to be understood, however, that the invention may be applied to other types of slicing machines, such as for example slicing machines in which the carriage is reciprocated by turning a fly-wheel, or machines in which both the knife and the carriage are hand driven or motor driven.

A slice deflector 20 is mounted on the forward side of the knife 12 and is operatively connected with the knife guard 21 and the skin support 22, Fig. 1. The mounting for the slice deflector 20, the knife guard 21, and the skin support 22, comprises two pivotally connected members 23 and 24. The member 24 is provided with an upstanding pin 25 which is adapted to enter a hole 26 formed in the member 23. The member 24 is secured by a bolt 27 to the base 10 of the slicing machine, Fig. 3.

The skin support 22 may be mounted on the member 23 for the purpose of permitting the support to be adjusted in various directions. One means of adjustably mounting the skin support is to provide enlarged openings 22' in the member 23 in which the screws 22'' pass, the heads of the screws being relatively large to provide a firm bearing for holding the parts in adjusted position, as shown in Fig. 4.

The slice deflector 20 is formed with an extension 28 by means of which it is attached, by welding or otherwise, to the outer face of the member 23. The knife guard 21 may be formed integrally with the skin support 22, the skin support being secured to the top of a cover plate 29 on the member 23, Figs. 3 and 4. An advantage in making the shield 20, the guard 21, and the support 22 in one piece is that the three units may be adjustable as a single unit. After the knife has worn down, these three elements can be adjusted as a single unit thereby guaranteeing the best possible protection and avoiding dangerous misadjustment in relation to the knife. The knife shield moves into closing position against the knife in a direction from the operator toward the knife support. This is the same direction in which the slices move and which the operator catches with his hand. In so doing, the operator's hand movement is also in the same direction. The severed slices move between the guard 21 and the shield 20, and it is, therefore, evident that the slices and the movement of the operator's hand tend to position the shield in a direction away from its hinge. This becomes very important when the knife shield happens to be carelessly closed. In the conventional mounting the knife shield hinge has a tendency to open away from the knife and endanger the operator.

The members 23 and 24 are respectively formed with projections or portions 30 and 31 which enter into superposed relationship when the slice deflector occupies its operative position, the operative position being that shown in which the slice deflector is disposed adjacent to the knife as shown in full lines in Figs. 1 and 2. The projection 30 is provided with a vertically slidable pin 32, the bottom end of which is pointed and the top end of which is pressed downward by a spring 33 against a retaining stop 34. The lower end of the pin 32 is adapted to register with and enter a hole 35 provided in the lug 31. The parts are so constructed that when the slice deflector is turned into operative position, the projections 30 and 31 will interlock and the pin 32 will enter the hole 35 thus serving as an automatic catch to maintain the parts in interlocked position. When the members 23 and 24 are interlocked in this fashion, the member 23 and the parts 20, 21, and 22 attached thereto, cannot be removed from the machine.

When desired, the member 23 and the parts attached thereto can be turned as a unit in a direction from that shown in full lines in Fig. 2 to the position shown in dotted lines. During movement of the member 23, the catch 32 automatically yields to permit turning movement. The operator can easily reach the slice deflector when turned in this manner, permitting him to clean it and the back of the knife with facility. Thereafter by simply pressing the deflector back into operative position it will become automatically locked. Thus, the slice deflector may be turned from its operative position to its inoperative position by moving it in a direction away from the knife supporting bracket 16, which direction is toward the operator's stance. As soon as the projection 31 moves from below the projection 30, the member 23 and the parts attached thereto, may be moved as a unit from the machine by simply sliding the member 23 upward out of engagement with the pin 25.

The operative position of the slice deflector and the associated parts is defined by an adjustable pin 36 which projects from the member 30 and abuts against a facing 37 on the member 31. This adjustable pin 36 acts as a stop for the member 23 when the latter is turned into operative position.

In order that the parts 20, 21, and 22 can be adjusted relative to the knife, the member 24 is formed with a horizontal groove 38, Fig. 4, which engages with a corresponding rib 39 formed on the base plate 10. The member 24 is also formed with a slot 40, Fig. 2, through which the tap bolt 27 passes. By this slidable connection the members 23, 24, and the parts attached thereto can be adjusted as a unit horizontally toward and away from the knife.

The invention provides a safety and deflecting unit for rotary slicing knives which unit is adjustable horizontally to proper operative position. The unit is likewise adapted to be swung into and out of operative position. When the unit is swung into operative position it automatically becomes locked in that position. Furthermore, the deflector, the guard, and the skin support may be removed with safety when desirable.

The invention provides simple and efficient means for swinging the deflector, guard, and associated parts out of operative position to permit the knife and other parts of the slicing machine to be readily cleaned. The invention also has the advantage that the parts are swung toward the operator and away from the knife supporting bracket. This arrangement allows for easier and quicker operation and provides more space in which the operator may work and reduces the danger to the operator when cleaning the device.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a slicing machine, a rotary circular knife, a skin support, a slice deflector and a knife guard arranged adjacent said knife, said support, deflector, and guard being rigidly connected and movable as a single unit, a member upon which said latter three rigidly connected members are supported, a second member slidably mounted on a part of said machine, means for pivotally and removably mounting the first named member to said last named second member, and means for locking the first named member to the last named second member.

2. In a slicing machine, a rotary circular knife, a skin support, a slice deflector and a knife guard arranged adjacent said knife, a member to which said support, deflector, and guard are rigidly connected and supported to operate as a unit, a second member slidably mounted on a part of said machine, means for pivotally and removably mounting the first member to said second member, and an adjustable stop carried by said second member for limiting the movement of the first member.

3. In a slicing machine having a base, a rotary circular knife mounted adjacent said base, a member slidably mounted on said base, a second member pivotally and removably connected to the first member, a skin support, slice deflector and knife guard rigidly fixed to said second member and movable therewith as a single unit, and means for locking the second member to the first member.

4. In a slicing machine, a base for said slicing machine, a member adjustably supported on said base, a second member pivotally mounted to said first member, a skin support, knife guard and slice deflector carried by said second member, and means for adjusting the skin support relative to said second member.

5. In a slicing machine, a rotary circular knife, a skin support, a slice deflector and a knife guard arranged adjacent said knife, a pivotally mounted member carrying said guard, deflector and support, whereby said latter three members are movable as a unit toward and away from said knife, and means for adjusting the skin support relative to said pivotally mounted member.

WILHELMUS ADRIANUS van BERKEL.